US008264815B2

(12) United States Patent
Yun et al.

(10) Patent No.: US 8,264,815 B2
(45) Date of Patent: Sep. 11, 2012

(54) MULTILAYER CERAMIC CAPACITOR AND METHOD FOR MANUFACTURING THE SAME

(75) Inventors: Hyea Sun Yun, Gyunggi-do (KR); Gee Lyong Kim, Gyunggi-do (KR); Doo Young Kim, Gyunggi-do (KR); Gi Woo Lee, Gyunggi-do (KR); Dong Ik Chang, Gyunggi-do (KR)

(73) Assignee: Samsung Electro-Mechanics Co., Ltd., Gyunggi-Do (KR)

(*) Notice: Subject to any disclaimer, the term of this patent is extended or adjusted under 35 U.S.C. 154(b) by 167 days.

(21) Appl. No.: 12/845,313

(22) Filed: Jul. 28, 2010

(65) Prior Publication Data

US 2011/0141656 A1 Jun. 16, 2011

(30) Foreign Application Priority Data

Dec. 10, 2009 (KR) ........................ 10-2009-0122192

(51) Int. Cl.
*H01G 4/06* (2006.01)

(52) U.S. Cl. ........ 361/311; 361/303; 361/305; 361/313; 361/321.2; 361/306.1

(58) Field of Classification Search .................. 361/311, 361/301.2, 301.4, 303–305, 312–313, 306.1, 361/306.3, 321.1, 321.2
See application file for complete search history.

(56) References Cited

U.S. PATENT DOCUMENTS 6,181,543 B1 * 1/2001 Kobayashi et al. ........ 361/301.3
6,407,906 B1 * 6/2002 Ahiko et al. ............... 361/306.1
6,407,907 B1 * 6/2002 Ahiko et al. ............... 361/306.3
7,042,706 B2 * 5/2006 Nagai et al. ................... 361/305
7,099,141 B1 * 8/2006 Kaufman et al. ............. 361/311
7,715,171 B2 * 5/2010 Nakano et al. ................ 361/303
7,968,486 B2 * 6/2011 Yamaguchi .................. 501/139
2006/0203420 A1 9/2006 Okuyama
2006/0245141 A1 11/2006 Shirasu et al.
2009/0067117 A1 3/2009 Kasuya et al.

FOREIGN PATENT DOCUMENTS

JP 60-049621 U 4/1985

(Continued)

OTHER PUBLICATIONS

Korean Office Action, w/ English translation thereof, issued in Korean Patent Application No. KR 10-2009-0122192 dated Mar. 28, 2011.

(Continued)

*Primary Examiner* — Nguyen T Ha

(74) *Attorney, Agent, or Firm* — McDermott Will & Emery LLP

(57) ABSTRACT

A multilayer ceramic capacitor includes: a ceramic element; a plurality of first and second inner electrodes formed at the interior of the ceramic element and including capacity contribution portions facing each other and capacity non-contribution portions extending from the capacity contribution portions and having one end alternately exposed from the side of the ceramic element; first and second outer electrodes formed at the side of the ceramic main body and electrically connected with the first and second inner electrodes, wherein the thickness of the capacity non-contribution portion is greater than that of the capacity contribution portion and connectivity of the capacity non-contribution portion is higher than that of the capacity contribution portion at one or more of the first and second inner electrodes.

6 Claims, 2 Drawing Sheets

100
110
150
160
121
122
123
120
140
130
S
L
M

FOREIGN PATENT DOCUMENTS

| | | | |
|---|---|---|---|
| JP | 05-335175 | A | 12/1993 |
| JP | 09-069463 | A | 3/1997 |
| JP | 10-050548 | | 2/1998 |
| JP | 11-273995 | A | 10/1999 |
| JP | 2001-257127 | | 9/2001 |
| JP | 2003-217968 | | 7/2003 |
| JP | 2004-228468 | A | 8/2004 |
| JP | 2006-253371 | A | 9/2006 |
| JP | 2006-332601 | | 12/2006 |
| JP | 2009-032837 | A | 2/2009 |

OTHER PUBLICATIONS

Japanese Office Action, with English translation, issued in Japanese Patent Application No. 2010-167056, dated Dec. 6, 2011.

Japanese Office Action, and English translation thereof, issued in Japanese Patent Application No. 2010-167056 dated Jun. 19, 2012.

* cited by examiner

MULTILAYER CERAMIC CAPACITOR AND METHOD FOR MANUFACTURING THE SAME

CROSS-REFERENCE TO RELATED APPLICATIONS

This application claims the priority of Korean Patent Application No. 10-2009-0122192 filed on Dec. 10, 2009, in the Korean Intellectual Property Office, the disclosure of which is incorporated herein by reference.

BACKGROUND OF THE INVENTION

1. Field of the Invention

The present invention relates to a multilayer ceramic capacitor and method for manufacturing the same, and more particularly, to a multilayer ceramic capacitor having a low defect rate and a high temperature load failure rate.

2. Description of the Related Art

In general, an electronic component using a ceramic material such as a capacitor, an inductor, a piezoelectric element, a varistor, a thermistor, or the like, includes a ceramic main body made of a ceramic material, inner electrodes formed within the interior of the ceramic main body, and outer electrodes installed on a surface of the ceramic main body such that they are connected with the inner electrode.

Among ceramic electronic components, a multilayer ceramic capacitor includes a plurality of stacked dielectric layers, inner electrodes disposed to face each other with a dielectric layer interposed therebetween, and outer electrodes electrically connected with the inner electrodes.

The multilayer ceramic capacitor is commonly used as a component of mobile communication devices such as computers, PDAs (Personal Digital Assistants), mobile phones, and the like, due to its advantages of being small, guaranteeing a high capacity, and being easily mounted.

Recently, as electronic products have been reduced in size and have developed multifunctionality, chip components have also become compact and highly functional, so a product of a multilayer ceramic capacitor which is small but has a high capacity is in demand.

In general, in manufacturing a multilayer ceramic capacitor, a ceramic green sheet is manufactured and a conductive paste is printed onto the ceramic green sheet to form an inner electrode film. Tens to hundreds of ceramic green sheets, each with the inner electrode film formed thereon, are piled up in an overlapping manner to form a green ceramic stacked body. Thereafter, the green ceramic stacked body is compressed at a high temperature and with a high pressure into a hard green ceramic stacked body, which is then subjected to a cutting process to manufacture a green chip. The green chip is plasticized, fired, and polished, and outer electrodes are then formed to complete a multilayer ceramic capacitor.

Recently, as the multilayer ceramic capacitor has become compact with a large capacity, designers have attempted to design the ceramic stacked body such that it has thinner films and is multi-layered. Thus, as the ceramic green sheet is thinner and multi-layered, there is a difference in the thickness of the ceramic green sheet layer with inner electrodes formed thereon and in the thickness of the ceramic green sheet layer without an inner electrode, causing a difference in density after compression.

The difference in the thickness and density causes an internal structural defect such as a crack, a pore, and the like.

The problem of such an internal structural defect becomes severe as the multilayer ceramic capacitor is highly stacked, and the necessity of improving the problem increases.

SUMMARY OF THE INVENTION

An aspect of the present invention provides a ceramic capacitor having a low defect rate and high temperature load failure rate.

According to an aspect of the present invention, there is provided a multilayer ceramic capacitor including: a ceramic element; a plurality of first and second inner electrodes formed at the interior of the ceramic element and including capacity contribution portions facing each other and capacity non-contribution portions extending from the capacity contribution portions and having one end alternately exposed from the side of the ceramic element; first and second outer electrodes formed at the side of the ceramic main body and electrically connected with the first and second inner electrodes, wherein the thickness of the capacity non-contribution portions is greater than that of the capacity contribution portions and connectivity of the capacity non-contribution portions is stronger than that of the capacity contribution portions at one or more of the first and second inner electrodes.

The thickness of the capacity non-contribution portion may be 1.1 to 1.5 times that of the capacity contribution portion.

The thickness of the capacity non-contribution portion may increase toward the side of the ceramic element from the capacity contribution portion.

The connectivity of the capacity non-contribution portion may be 80 percent to 98 percent.

According to another aspect of the present invention, there is provided a method for manufacturing a multilayer ceramic capacitor, including: producing a plurality of ceramic green sheets; forming first and second inner electrode patterns including a capacity contribution portion and a capacity non-contribution portion on the ceramic green sheets such that the capacity non-contribution portion has a greater thickness than that of the capacity contribution portion; stacking the ceramic green sheets such that the capacity contribution portions of the first and second inner electrode patterns face each other, to form a ceramic stacked body; cutting the ceramic stacked body such that one end of each of the capacity non-contribution portions is exposed from the side, and firing the same to form a ceramic sintered body; and forming first and second outer electrodes on the side of the ceramic sintered body such that the first and second outer electrodes are electrically connected with one end of each of the capacity non-contribution portions.

The first and second inner electrode patterns may be formed through gravure printing.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
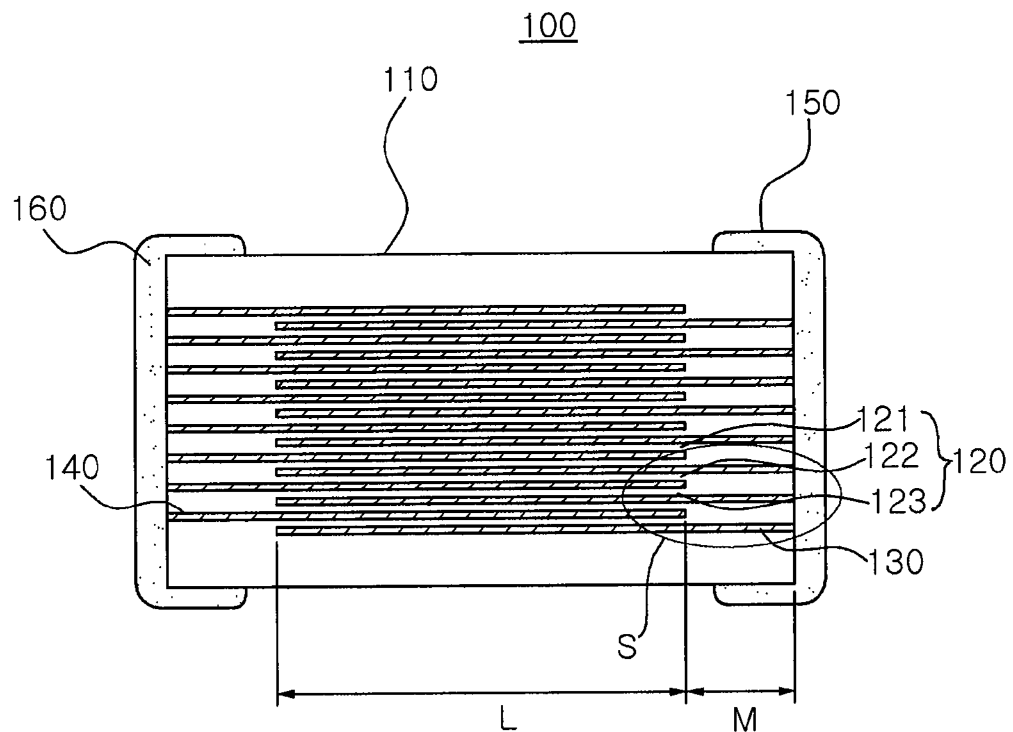
FIG. 1 is a schematic sectional view showing a multilayer ceramic capacitor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 2:
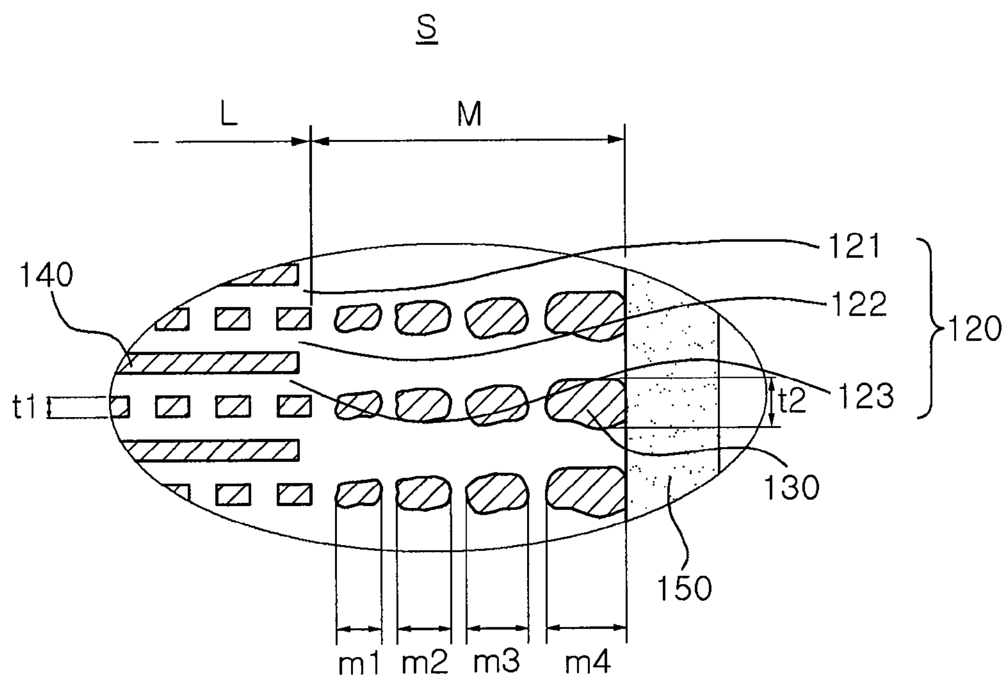
FIG. 2 is an enlarged sectional view of a portion 'S' in FIG. 1.

FIG. 1 is a schematic sectional view showing a multilayer ceramic capacitor according to an exemplary embodiment of the present invention, and FIG. 2 is an enlarged sectional view of a portion 'S' in FIG. 1.

With reference to FIGS. 1 and 2, a multilayer ceramic capacitor 100 according to the present exemplary embodiment includes a ceramic element 110, first and second inner electrodes 130 and 140 formed within the interior of the ceramic element 110, and first and second outer electrodes 150 and 160 electrically connected with the first and second inner electrodes 130 and 140.

The ceramic element 110 is formed by stacking a plurality of ceramic dielectric layers 121, 122, and 123 and then sintering them, and in this case, the contiguous dielectric layers are integrated such that there is no boundary seen therebetween.

The ceramic dielectric layer 120 may be made of a ceramic material having a high permittivity, but the present invention is not limited thereto and the ceramic dielectric layer 120 may be also made of a barium titanate ($BaTiO_3$)-based material, a complex perovskite-based material, strontium titanate ($SrTiO_3$)-based material, or the like.

The first and second inner electrodes 130 and 140 are formed between the dielectric layers in the process of stacking the plurality of dielectric layers. Namely, the first and second inner electrodes 130 and 140 are formed with one dielectric layer interposed therebetween at the interior of the ceramic element 110 through sintering.

The first and second inner electrodes 130 and 140 are a pair of electrodes having different polarities, which are disposed to face each other according to a direction in which the dielectric layers are stacked. The first and second inner electrodes 130 and 140 include capacity contribution portions (L) facing each other and capacity non-contribution portions (M) extending from the capacity contribution portions (L). One end of each of the capacity non-contribution portions (M) is exposed from the side of the ceramic element 110. One end of each of the first and second inner electrodes 130 and 140 is alternately exposed from both sides of the ceramic element 110.

The first and second inner electrodes 130 and 140 are made of a conductive metal. For example, the first and second inner electrodes 130 and 140 may be made of nickel (Ni) or a Ni alloy. Preferably, the Ni alloy contains manganese (Mn), chromium (Cr), cobalt (Co), or aluminum (Al), along with nickel (Ni).

One end of each of the first and second inner electrodes exposed from the side of the ceramic element 110 is electrically connected with the first and second outer electrodes 150 and 160.

As shown in FIG. 2, a thickness (t2) of the capacity non-contribution portion (M) of one or more of the plurality of first and second inner electrodes is greater than a thickness (t1) of the capacity contribution portion (L), and in this case, the thickness (t2) may be 1.1 to 1.5 times the thickness (t1) of the capacity contribution portion (L). If the thickness (t2) of the capacity non-contribution portion (M) is smaller than 1.1 times, a reduction effect of the difference in the thickness and density will not be great, and the connectivity would deteriorate, and if the thickness (t2) of the capacity non-contribution portion (M) is larger than 1.5 times, the thickness and density of the dielectric layers including the capacity contribution portion would increase to cause an internal defect such as cracks, pores, and the like.

The thickness of the capacity non-contribution portion (M) may increase toward the side of the ceramic element 110 from the capacity contribution portion (L).

The capacity non-contribution portion (M) of the first and second inner electrodes 130 and 140 does not face each other, so there is a difference in thickness and density between the dielectric layer having the capacity non-contribution portion (M) and the dielectric layer having the capacity contribution portion (L). The difference in the thickness and density causes cracks and pores at a dielectric layer area having a relatively low density.

However, in the present exemplary embodiment, because the thickness (t2) of the capacity non-contribution portion (M) is greater than the thickness (t1) of the capacity contribution portion (L), the difference in the thickness and density between the dielectric layers can be reduced.

Also, the connectivity of the capacity non-contribution portion (M) is greater than that of the capacity contribution portion (L). The first and second inner electrodes contract to be discontinuously formed when a conductive paste is sintered. The connectivity may be defined as a ratio of the sum of the areas where a conductive material is formed to the overall length of the first and second inner electrodes.

The connectivity of the capacity non-contribution portion (M) of the first and second inner electrodes 130 and 140 may be defined as m1+m2+m3+m4/M, and it may be 80 percent to 98 percent.

In the present exemplary embodiment, because the difference in the thickness and density between the dielectric layers is reduced, a defect rate caused by cracks or pores can be reduced, and because the connectivity with the outer electrodes increases, the capacity can be maximized.

A method for manufacturing a multilayer ceramic capacitor according to an exemplary embodiment will now be described.

First, slurry is prepared by mixing ceramic powder, a binder, and a solvent, coated on a carrier film, and dried to fabricate ceramic green sheets 121*a*, 122*a*, and 123*a* of a few μm.

A conductive paste is coated on the fabricated ceramic green sheets to form inner electrode patterns. The inner electrode patterns include the capacity contribution portion and the capacity non-contribution portion, and in this case, the thickness of the capacity non-contribution portion is greater than that of the capacity contribution portion.

The inner electrode patterns may be formed through gravure printing, and it may be configured such that the thickness of the capacity non-contribution portion is greater by adjusting the depth and size of a cell of a gravure roll.

Thereafter, the ceramic green sheets each with the inner electrode patterns formed thereon are piled up in an overlap manner in a thicknesswise direction and are then thermally compressed to fabricate a ceramic stacked body.

Figure 3:
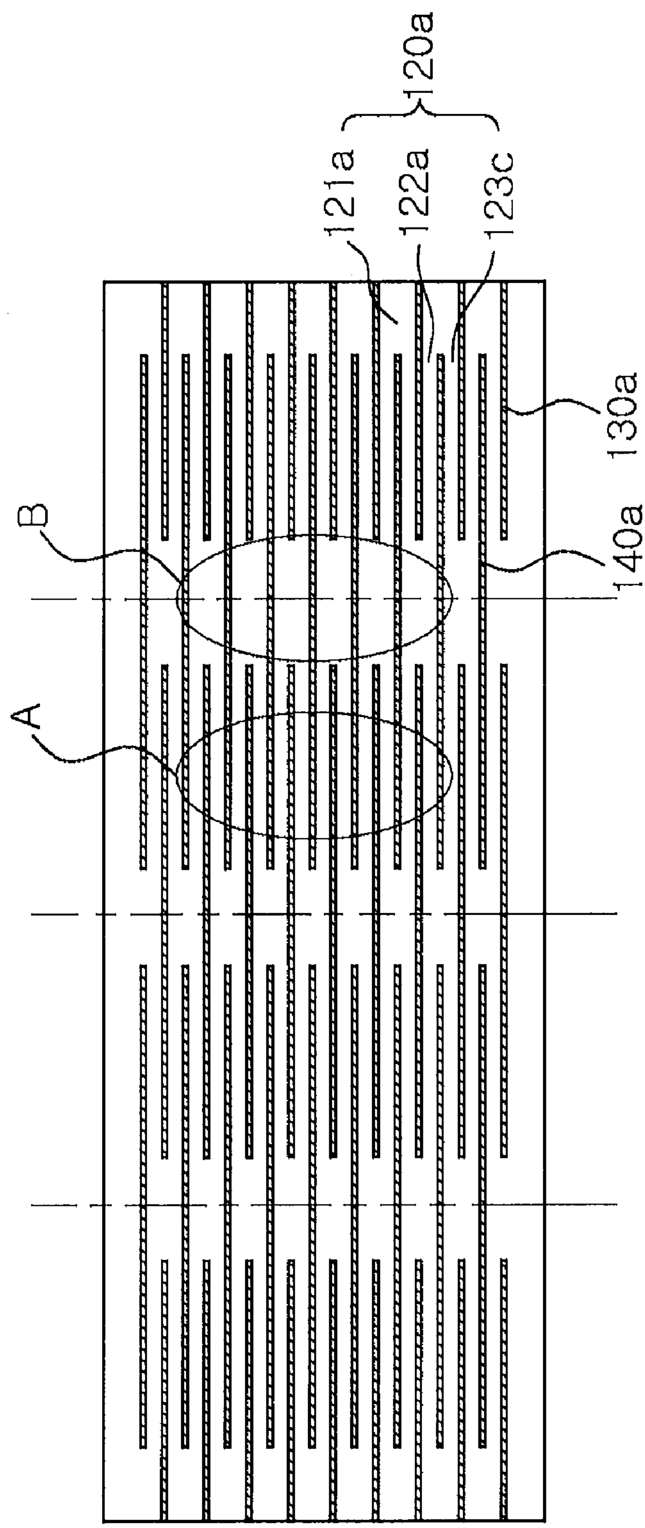
FIG. 3 is a schematic sectional view showing a ceramic stacked body.

FIG. 3 is a schematic sectional view showing a ceramic stacked body. With reference to FIG. 3, the plurality of ceramic green sheets 121*a*, 122*b*, and 123*c* have the first and second inner electrode patterns 130*a* and 140*a* printed thereon and are stacked such that the first and second inner electrode patterns partially overlap with each other. Overlapping portions of the first and second inner electrode patterns face each other to form the capacity contribution portion, and non-overlapping portions of the first and second inner electrode patterns form the capacity non-contribution portion.

When the ceramic stacked body is compressed, there may be a difference in thickness and density between the area (A) of the dielectric layers where the capacity contribution portion is formed with the first and second inner electrodes facing each other and the area (B) of the dielectric layers where the capacity non-contribution portion is formed.

However, in the present exemplary embodiment, because the thickness of the capacity non-contribution portion is greater than that of the capacity contribution portion of the inner electrodes, there is not much difference in the thickness and density between the area (A) of the dielectric layers and the area (B) of the dielectric layers.

Thereafter, the ceramic stacked body is cut to fit a chip size and then fired. The firing may be performed at 1,100 degrees Celsius to 1,300 degrees Celsius under an $N_2$—$H_2$ atmosphere. In this case, the capacity non-contribution portion is formed to have a greater connectivity than that of the capacity contribution portion, and the connectivity of the capacity non-contribution portion may be 80 percent to 98 percent.

And then, the first and second outer electrodes are formed such that they are electrically connected with one end of each of the first and second inner electrodes exposed from the side of the ceramic main body.

The fabricated stacked ceramic capacitor was evaluated as to whether or not it had a delamination or crack (defective fired body) under the conditions as shown in Table 1 below, and a failure rate was evaluated by performing a high temperature load testing under the conditions of 130 degrees Celsius, 2VR, and 15 Hr.

TABLE 1

| | Print thickness | | | | | Connec- |
|---|---|---|---|---|---|---|
| | Capacity contri-bution portion (L) | Capacity non-contri-bution portion (M) | Thick-ness rate (M/L) | Defect rate (%) | High temper-ature load failure rate (FIT) | tivity of capacity non-contri-bution portion (%) |
| 1 | 0.92 | 0.92 | 1.0 | 6.5 | 58.68 | 72 |
| 2 | 0.93 | 0.98 | 1.05 | 4.0 | 50.41 | 74 |
| 3 | 0.93 | 1.07 | 1.15 | 1.4 | 24.49 | 78 |
| 4 | 0.92 | 1.02 | 1.11 | 1.3 | 7.32 | 87 |
| 5 | 0.92 | 1.16 | 1.26 | 1.2 | 3.34 | 91 |
| 6 | 0.91 | 1.22 | 1.34 | 1.2 | 1.93 | 89 |
| 7 | 0.92 | 1.35 | 1.48 | 1.2 | 2.29 | 93 |
| 8 | 0.92 | 1.38 | 1.5 | 1.1 | 33.58 | 76 |
| 9 | 0.92 | 1.38 | 1.5 | 1.0 | 2 | 95 |
| 10 | 0.93 | 1.39 | 1.6 | 2.9 | 15.97 | 99 |

With reference to Table 1, in the cases 4 and 8, the thickness of the capacity non-contribution portion of the first and second inner electrodes is greater by 1.1 to 1.5 times than that of the capacity contribution portion and the connectivity is superior, having a low defect rate and low high temperature load failure rate. In comparison, in the cases 1 and 2, the thickness rate of the capacity non-contribution portion and the capacity contribution portion of the first and second inner electrodes is smaller than 1.1, having a high defect rate. In the cases of 3 and 9, the thickness rate is 1.1 to 1.5 but the connectivity is low, having a high high temperature load failure rate. The case 10 has a high defect rate and high high temperature load failure rate.

As set forth above, according to exemplary embodiments of the invention, the multilayer ceramic capacitor is configured such that the thickness of the capacity non-contribution portion is greater than that of the capacity contribution portion, the difference in thickness and density between dielectric layers can be reduced. Accordingly, a defect rate caused by a crack, a pore, or the like, is decreased.

In addition, because the connectivity of the capacity non-contribution portion of the inner electrode is greater than that of the capacity contribution portion, a high temperature load failure rate is low.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer ceramic capacitor comprising:

a ceramic element;

a plurality of first and second inner electrodes formed at the interior of the ceramic element and including capacity contribution portions facing each other and capacity non-contribution portions extending from the capacity contribution portions and having one end alternately exposed from the side of the ceramic element;

first and second outer electrodes formed at the side of the ceramic main body and electrically connected with the first and second inner electrodes, wherein the thickness of the capacity non-contribution portions is greater than that of the capacity contribution portions and connectivity of the capacity non-contribution portion is stronger than that of the capacity contribution portions at one or more of the first and second inner electrodes.

2. The multilayer ceramic capacitor of claim 1, wherein the thickness of the capacity non-contribution portion is 1.1 to 1.5 times that of the capacity contribution portion.

3. The multilayer ceramic capacitor of claim 1, wherein the thickness of the capacity non-contribution portion increases toward the side of the ceramic element from the capacity contribution portion.

4. The multilayer ceramic capacitor of claim 1, wherein the connectivity of the capacity non-contribution portion is 80 percent to 98 percent.

5. A method for manufacturing a multilayer ceramic capacitor, the method comprising:

producing a plurality of ceramic green sheets;

forming first and second inner electrode patterns including capacity contribution portions and capacity non-contribution portions on the ceramic green sheets such that the capacity non-contribution portions have a greater thickness than that of the capacity contribution portions;

stacking the ceramic green sheets such that the capacity contribution portions of the first and second inner electrode patterns face each other, to form a ceramic stacked body;

cutting the ceramic stacked body such that one end of each of the capacity non-contribution portions is exposed from the side, and firing the same to form a ceramic sintered body; and forming first and second outer electrodes on the side of the ceramic sintered body such that the first and second outer electrodes are electrically connected with one end of each of the capacity non-contribution portions.

6. The method of claim 5, wherein the first and second inner electrode patterns are formed through gravure printing.

* * * * *